United States Patent [19]

Iwata et al.

[11] Patent Number: 4,720,622

[45] Date of Patent: Jan. 19, 1988

[54] WALL-MOUNTED TYPE COOKING APPARATUS

[75] Inventors: Masao Iwata, Ohmi-Hachiman; Masahiro Tanaka, Ohtsu; Ichiro Inami, Shiga, all of Japan

[73] Assignee: Sanyo Electric Co., Ltd, Japan

[21] Appl. No.: 710,040

[22] Filed: Mar. 11, 1985

[51] Int. Cl.[4] .................................................. A21B 1/00

[52] U.S. Cl. .................................. 219/391; 248/309.1; 312/245

[58] Field of Search ................ 219/301, 391, 10.55 R; 248/220.2, 222.2, 309.1, 22.1, 224.4; 312/245, 248; 126/273 A

[56] References Cited

U.S. PATENT DOCUMENTS

| | | | |
|---|---|---|---|
| 141,292 | 7/1873 | Ruston | 16/144 |
| 2,729,411 | 1/1956 | Cahill | 248/224.4 |
| 2,915,960 | 12/1959 | McClellan | 126/273 A |
| 4,313,043 | 1/1982 | White et al. | 219/10.55 R |
| 4,453,690 | 6/1984 | Takeuji | 248/309.1 |
| 4,465,256 | 8/1984 | Wolbrink et al. | 312/245 |

FOREIGN PATENT DOCUMENTS

| | | | |
|---|---|---|---|
| 53-21098 | 8/1978 | Japan . | |
| 58-39321 | 9/1983 | Japan . | |
| 1075306 | 2/1960 | Switzerland | 219/35 |

*Primary Examiner*—Nicholas P. Godici
*Assistant Examiner*—Karen Skillman
*Attorney, Agent, or Firm*—Darby & Darby

[57] ABSTRACT

A wall-mounted type cooking apparatus of the present invention is mounted over a range in a kitchen and comprises a fixing plate mounted on a wall and a body fixed on said fixing plate and serving not only as a cooking apparatus but also as a ventilating apparatus for air nearby the range.

A body of the apparatus of the present invention is fixed on the fixing plate by engaging ridge-like shape engaging members formed by making a gap between the rear end of a bottom plate of the body and the lower end of a back plate with supporting members formed laterally on the fixing plate. The fixing plate is provided with locking members for inserting locking bars respectively thereinto in the upper portion thereof. The back plate is provided with an opening for projecting the locking members and the locking bars moving up and downwardly therethrough. The body is fixed on the fixing plate by forwardly projecting the locking member through the opening of the back plate and inserting the locking bar into the locking member.

Furthermore, since the front edge of the supporting member is cut off at the position corresponding to that of the spacer making the gap between the bottom plate of the body and the back plate, the spacer is put in the cut off portion when the engaging member of the body was engaged with the supporting member of the fixing plate, whereby the body is automatically positioned.

20 Claims, 25 Drawing Figures

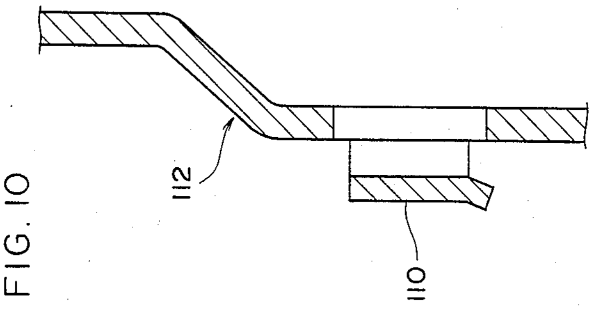
FIG. 10
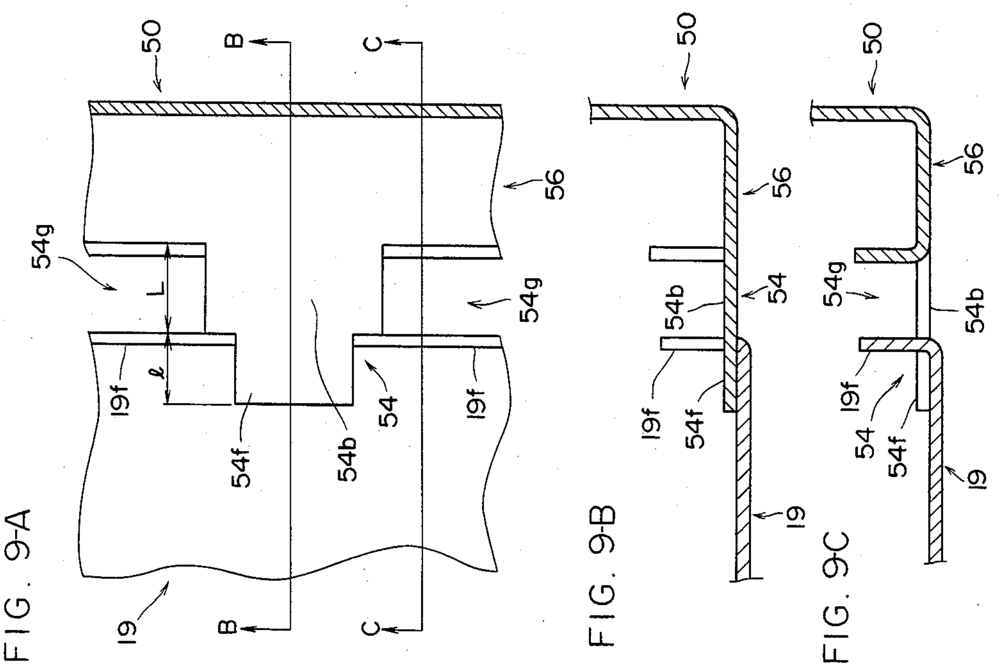
FIG. 9-A
FIG. 9-B
FIG. 9-C

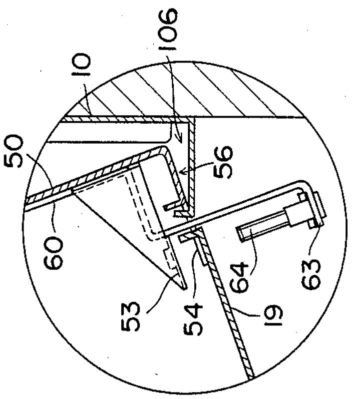
FIG. 11-B
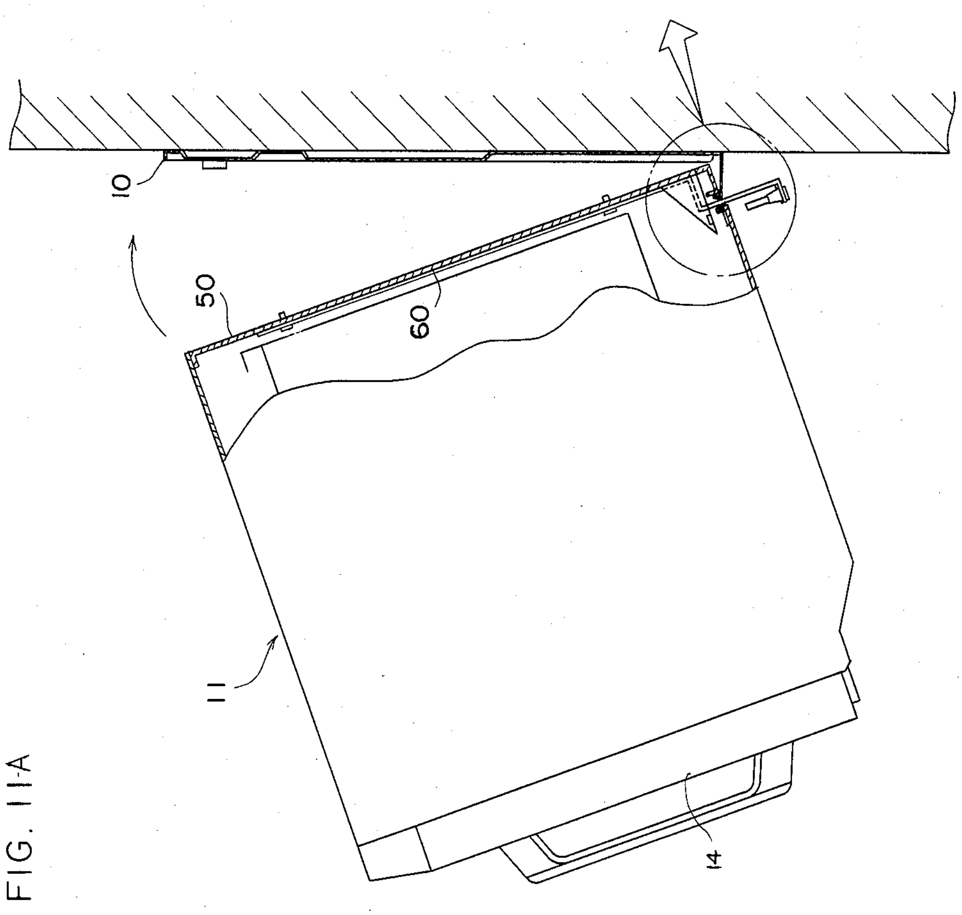
FIG. 11-A

FIG. 12-A
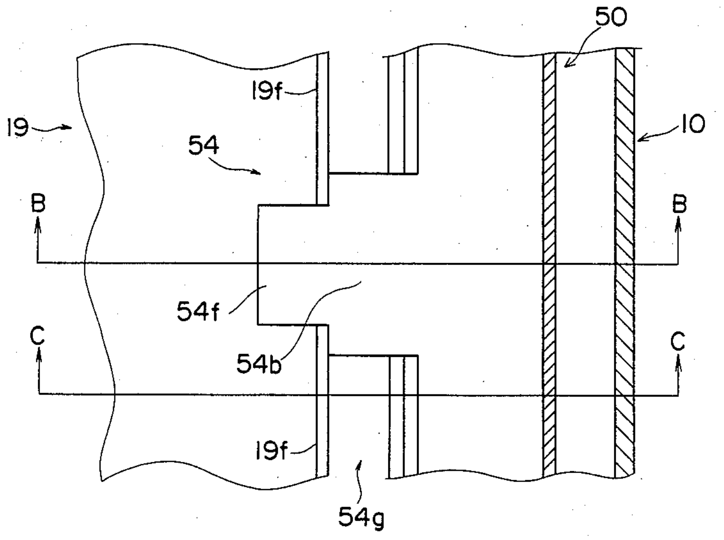
FIG. 12-B
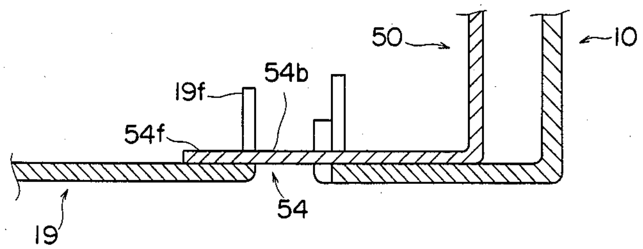
FIG. 12-C
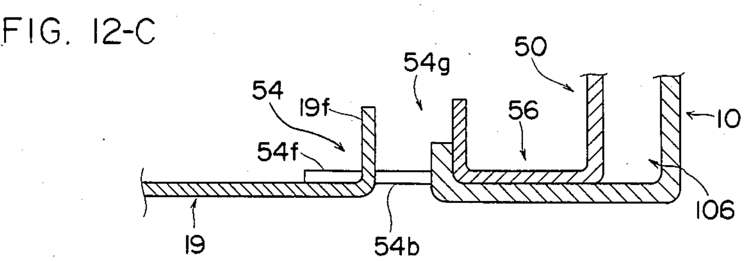

WALL-MOUNTED TYPE COOKING APPARATUS

BACKGROUND OF THE INVENTION

1. Field of the Invention

The present invention relates to a wall-mounted type cooking apparatus, in particular to a combination cooking apparatus such as microwave oven and ventilating apparatus mounted on a wall surface by utilizing a space, where a range hood is usually installed, directly over a range in a kitchen.

2. Description of the Prior Art

An electric range or a gas range has been used as the principal cooking apparatus in the modern kitchen. In order to exhaust hot air, smoke and the like produced in cooking, a range hood is installed directly over a range. In general, this range hood is put in a portion of a cabinet hung from the ceiling directly over the range and has the specified sizes, in particular the width including several kinds of standard size.

Although cooking apparatus especially, for example, a microwave oven has been wide spread and used in a kitchen of many homes in recent years, a counter top type microwave oven, which is placed on a cooking stand or table, has been the main current. However, since it obstructs the cooking to place the microwave oven on the cooking stand or table, a microwave oven capable of allowing the space saving of the kitchen has been practically used by installing a microwave oven incorporated the function of a ventilating apparatus therein in the above described space where a range hood has been usually installed.

One example of such a microwave oven is disclosed in U.S. Pat. No. 4,313,043. According to this patent, a microwave oven is adapted to construct so that the operation of installing it on the wall surface, more concretely describing, in a space, where a range hood is installed, can be carried out by one person. Concretely describing, the above microwave oven comprises a microwave oven operating module and a support assembly, the support assembly including an open sided support enclosure into which the operating module is slidably inserted. The support assembly is initially mounted in the position above a countertop or cooking surface and the module is inserted thereinto to complete the mounting process.

Since, according to the above described invention, a cover is first mounted before the support assembly is fixedly mounted in the position where an apparatus is mounted. Accordingly, in practice, a finished good can not be obtained until the microwave oven operating module, the support assembly and the cover are integrally assembled. Accordingly, since the wiring, the internal construction and the like are exposed in the portions other than the front of the microwave oven operating module until the assembling is completed, there has been the high possibility that they are broken or foreign bodies enter there, whereby leading to the occurance of troubles.

OBJECT OF THE INVENTION

The present invention was achieved in the light of the above described circumstances. Thus, it is the first object of the present invention to provide a wall-mounted type cooking apparatus having high completeness which is completed as a finished good even though the mounting thereof on the wall surface is not completed yet.

It is the second object of the present invention to provide a wall-mounted type cooking apparatus having no possibility that the internal construction, wiring and the like are broken in the mounting thereof on the wall surface.

It is the third object of the present invention to provide a wall-mounted type cooking apparatus which can be easily mounted on the wall surface.

It is a fourth object of the present invention to provide a wall-mounted type cooking apparatus which can be easily positioned in the mounting thereof on the wall surface.

It is the fifth object of the present invention to provide a wall-mounted type cooking apparatus which can be surely and fixedly mounted on the wall surface.

It is the sixth object of the present invention to provide a wall-mounted type cooking apparatus of which operating condition of a fixing member which fixes the apparatus on the wall surface can be easily confirmed.

It is the seventh object of the present invention to provide a wall-mounted type cooking apparatus which can be easily removed from the wall surface.

It is the eighth object of the present invention to provide a wall-mounted type cooking apparatus well-balanced in weight in the lateral directions.

The above and further objects and features of the invention will more fully be apparent from the following detailed description with accompanying drawings.

BRIEF DESCRIPTION OF THE DRAWINGS

FIG. 10 is a side sectional view showing the construction of a locking member, FIG. 11-A is a diagram showing the state of a wall-mounted type cooking apparatus of the present invention when mounted on the wall surface, FIG. 11-B is a partial enlarged view of the FIG. 11-A, FIGS. 12-A, B and C are a plan view and side sectional views showing the state of a back plate fixed on a fixing plate.

DETAILED DESCRIPTION OF THE INVENTION

Figure 1:
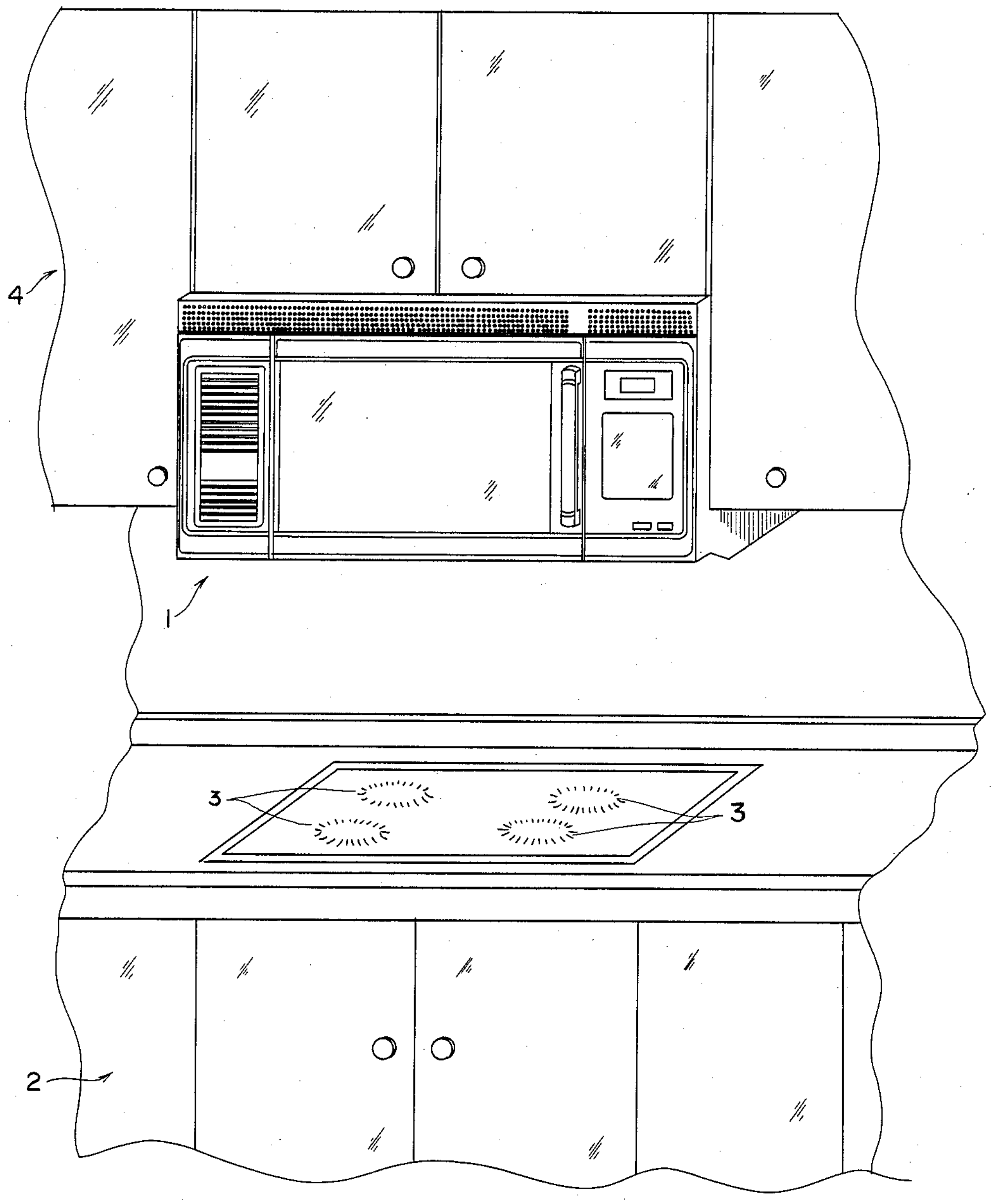
FIG. 1 is a schematic view showing the state of a wall-mounted type cooking apparatus of present invention being used.

A wall-mounted type cooking apparatus of the present invention is described below. Referring now to FIG. 1, which is a schematic view showing the state of a microwave oven as a wall-mounted type cooking apparatus of the present invention being used, that is to say, the state thereof mounting on the wall surface of a kitchen, 2 designates a floor cabinets, a plurality of heating units 3, 3 . . . being collectively arranged on a cooking surface of the floor cabinets 2 at one place thereof, and the heating unit comprising an electric range or a gas range. A wall-mounted cabinets 4 is hung from the ceiling or the wall surface over the floor cabinets 2. A space, in which usually a range hood is installed, is formed in a cut-off manner directly over the heating units 3, 3 . . . of the wall-mounted cabinets 4 at the appointed width (several kinds of standard size are established), an apparatus of the present invention being mounted in the space in which usually a range hood is installed.

Figure 2:
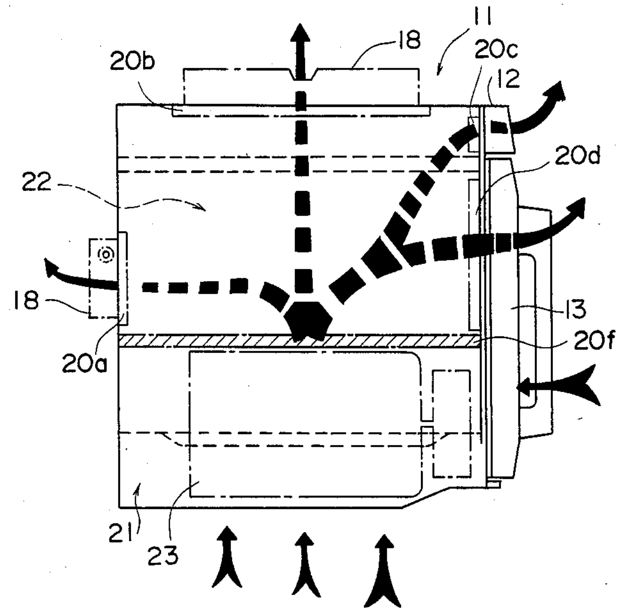
FIG. 2 is a left side view showing a wall-mounted type cooking apparatus of the present invention.
Figure 3:
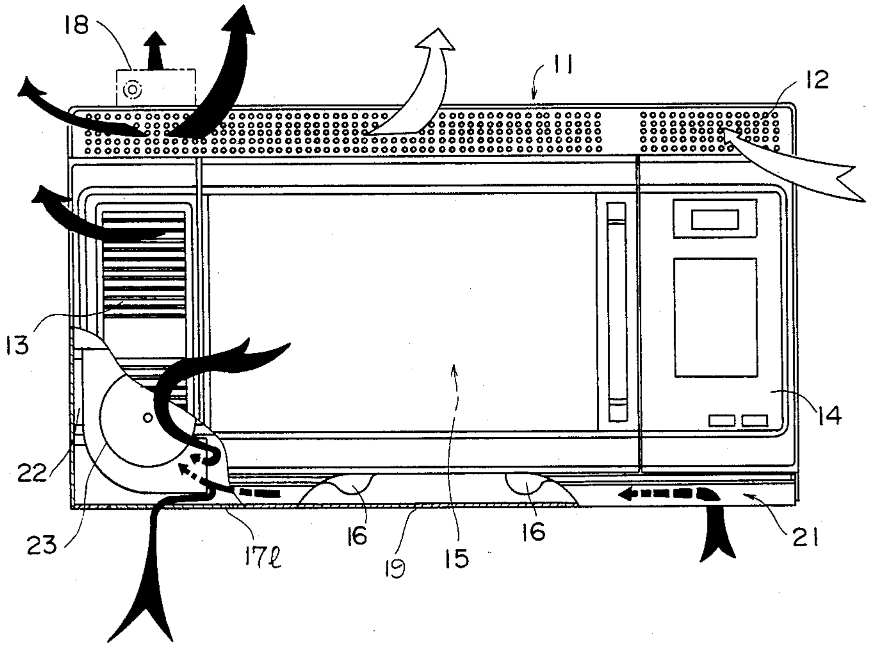
FIG. 3 is a front view showing a wall-mounted type cooking apparatus of the present invention.
Figure 4:
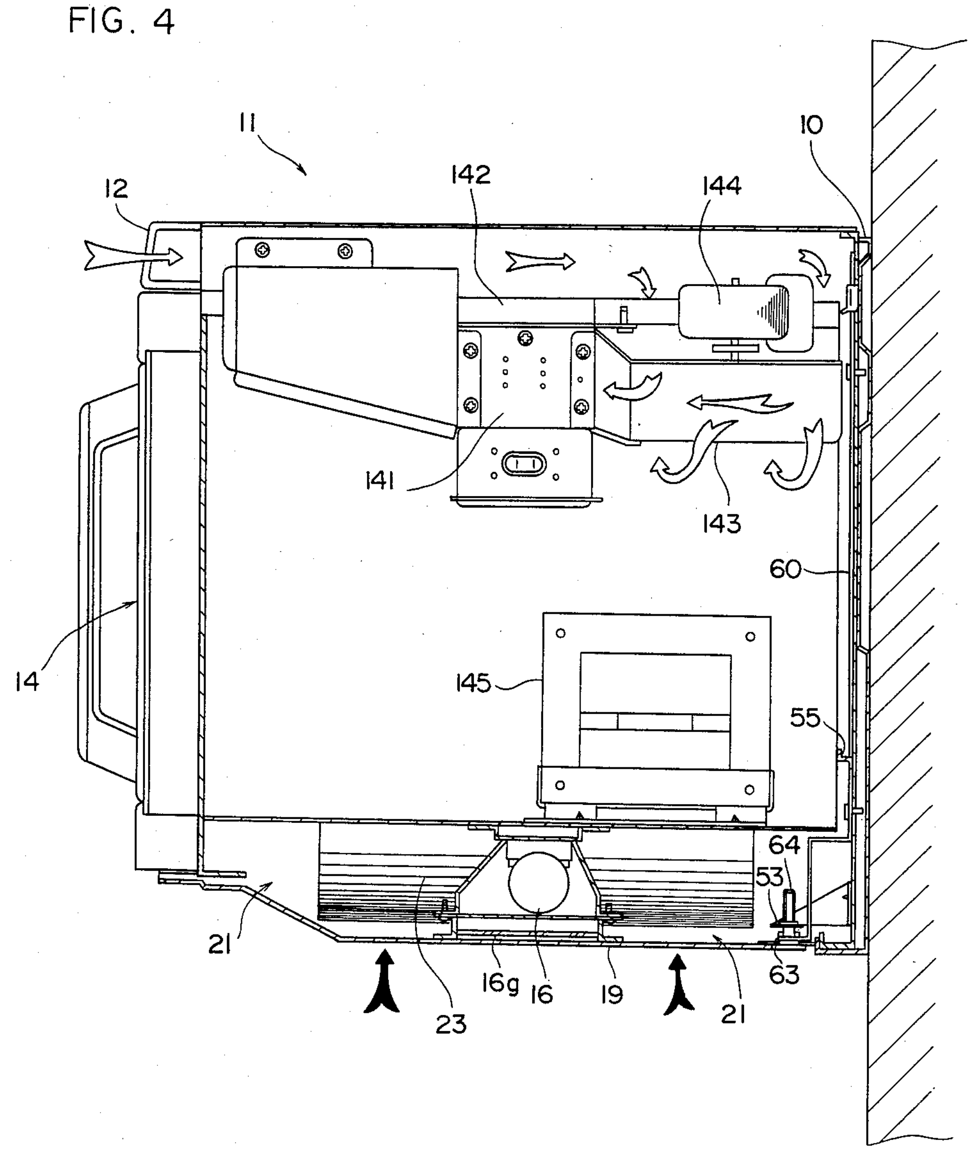
FIG. 4 is a right side sectional view showing a wall-mounted type cooking apparatus of the present invention.
Figure 5:
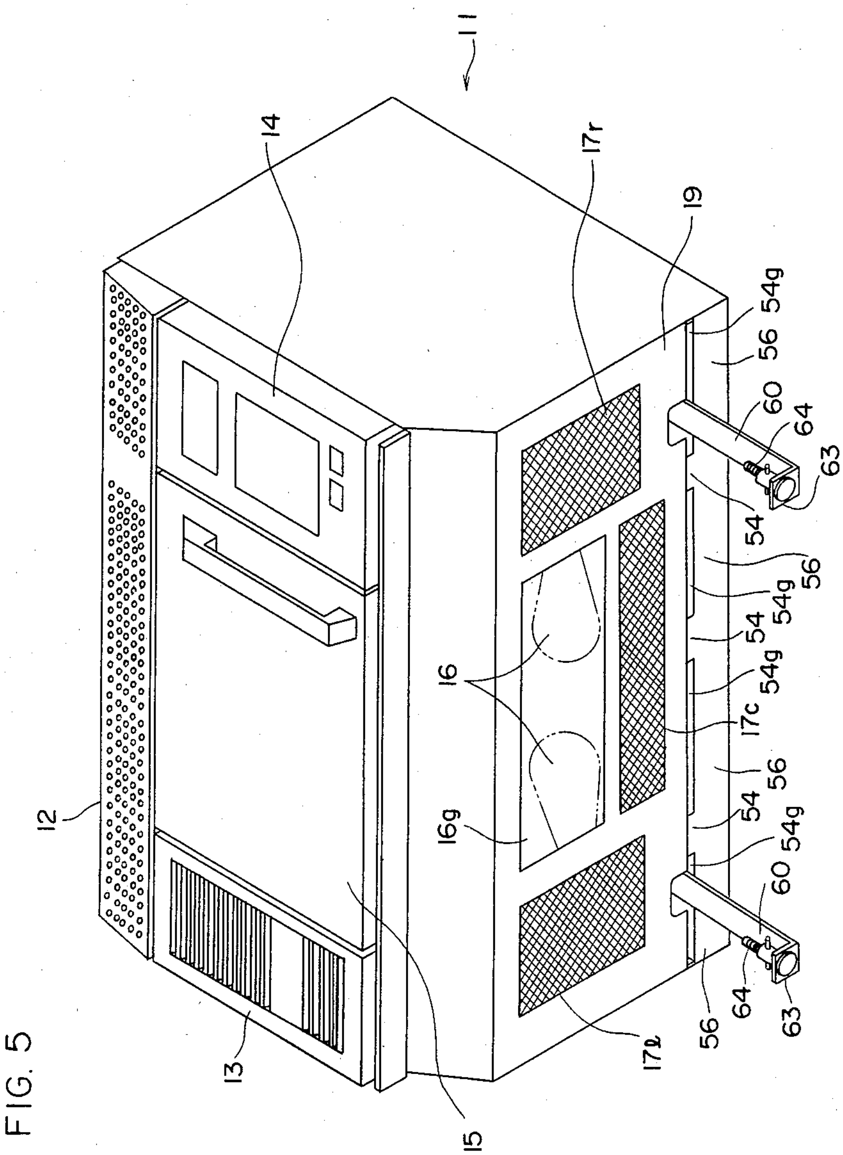
FIG. 5 is a schematic view showing a wall-mounted type cooking apparatus of the present invention seen from the right, front and downward direction.

Next, the construction of the body of the apparatus of the present invention will be described below with reference to FIG. 2 showing the left side of the apparatus, FIG. 3 showing the front thereof, FIG. 4 showing a right side sectional view and FIG. 5 showing the state thereof seen from the right, front and downward direction.

The body 11 is formed in an almost box-like shape, the body 11 being provided with an upper grille 12 all over the width on the upper portion of the front thereof, a left side grille 13 at the left end of a portion below the upper grille 12 and a control panel 14 at the right end of the portion below the upper grille 12. A door 15 of cooking chamber (the closed state thereof is shown) is installed between the left side grille 13 and the control panel 14. The grilles 12, 13 are adapted to be detachable if necessary.

As shown in FIG. 4, a magnetron 141 as a heating energy generator, a waveguide 142, a ventilating fan 143 for inside of the body 11, a motor 144 therefor, a transformer 145, a control apparatus (not shown) and the like are housed in the rear of the control panel 14.

Alike to the conventional microwave oven, a microwave generated by the magnetron 141 is introduced into a cooking chamber formed in the rear of the door 15 through the waveguide 142 to heat foods.

An almost box-like cooking chamber for heating foods to be cooked housed therein is formed in the rear of the door 15 thereof.

The upper grille 12 is used as an air inlet port for principally taking a cooling air for the magnetron 141 therein in a portion to the right side thereof (that is to say, a portion positioned over the control panel 14). That is to say, fresh air taken from the upper grille 12 through the right portion thereof by the rotation of the cooling fan 143 (as shown by white arrows) is used for cooling the magnetron 141 and then sent to the cooking chamber to be used for ventilating of air in the cooking chamber.

The air in the cooking chamber is exhausted out of the body 11 from the plurality of exhaust halls, which are formed at the left and innermost part of the upper wall of the cooking chamber, through a duct.

Although it goes without saying that alike to the conventional microwave oven, the apparatus of the present invention can also heat foodstuffs, it serves also as a apparatus for ventilating air in a kitchen. This point will be below described.

A bottom portion of the body 11 is formed in boxlike shape to form a bottom duct 21. The bottom duct 21 is provided with three bottom grilles 17*l*, 17*r*, 17*c* provided with a grease filter, respectively, at three places —both sides thereof and the place to the rear side of the central portion thereof—on a hood plate 19, that is to say, the bottom surface of the body 11 and a glass plate 16*g* is put in a portion to the front side of the central portion thereof. The portion inside the bottom duct 21 surrounding the glass plate 16*g* is defined to house work lamps 16 for use in illumination.

On the other hand, also in the rear of the left side grille 13 a left side duct 22, which extends from the bottom portion of the body 11 to the top thereof, is formed, the left end of the bottom duct 21 being connected with the lower end of the left side duct 22, and a cross flow fan 23 being installed at the portion, at which the left end of the bottom duct 21 is connected with the lower end of said left side duct 22, that is to say, the left end portion of the bottom of the body 11 (the portion directly over the left side bottom grille 17*l*) with a rotation axis thereof in the front and rear direction of the body 11. The cross flow fan 23 inhales air flowing into the bottom duct 21 from the right side bottom grille 17*r*, central bottom grille 17*c* left bottom grille 17*l* and downward portion of the left side grille 13 therein and exhaust air upwardly. In addition, a damper/duct connector 18 for connecting the left side duct 22 of the body 11 with the outside, that is to say, for example, a damper opened on the wall surface of a kitchen, on which an apparatus of the present invention is mounted, or a duct opened on the bottom surface of the wall-mounted cabinets 4 and the like can be detachably installed at the left end of the upper surface of the body 11 or at the position to the left end of the rear surface of the body 11. In the practical use, the damper/duct connector 18 is installed so as to be connected with a damper opened on the wall surface of a kitchen or a duct opened on the bottom of the wall-mounted cabinets 4. Owing to such a construction, as shown in FIG. 1, where an apparatus of the present invention is mounted directly over the heating units 3,3 . . . in the kitchen, heated air, smoke and the like resulting from the cooking using the heating units 3,3 . . . are inhaled in the bottom duct 21 from the bottom grilles 17*l*, 17*r*, 17*c* by the action of the cross flow fan 23, as shown by black arrows in FIGS. 2 to 4.

The air inhaled into the bottom duct 21 rises through the left side duct 22, and passes through a course which is suitably selected from three courses corresponding to the state of a mounting position of the body 11. The first course of the air from the left side duct 22 is that the air is exhausted out of the kitchen through the damper/-duct connector 18 installed at the left side portion of the rear surface of the body 11. The second one is that the air is exhausted out of the kitchen through the damper/-duct connector 18 installed a the left side portion of the upper surface of the body 11. The third one is that the air is exhausted in the front of the body 11 through the left side portion of the upper grille 12 and the upper half portion of the left side grille 13. In addition, when one course is selected from abovementioned three courses, the remaining two courses are closed with following manner as shown in FIG. 2. For closing the first course, a partition plate 20*a* is installed at the inside of the installing position of the damper/duct connector 18 for the first course. For closing the second course, a partition plate 20*b* is installed at the inside of the installing position of the damper/duct connector 18 for the second course. For closing the third course, partition plates 20*c* and 20*d* are installed at the inside of the left side portion of the upper grille 12 and inside of the upper half portion of the left side grille 13 respectively. Furthermore, when the third course is selected, a charcoal filter 20*f* is installed at about medium positions of the third course (about medium position of the left side duct 22) so as to absorpting odor and gas components or the like in the air to be exhausted to the front of the body 11.

In addition, in the apparatus of the present invention, the principal instruments for heating foods such as the magnetron 141 and the transformer 145 are housed in the back of the control panel 14 provided at the right end portion of the body 11, the cross flow fan 23 being provided at the left end portion of the body 11, and the damper/duct connector 18 being provided at the left side portion of the body 11. Accordingly, the apparatus of the present invention is comparatively well-balanced in weight in the right and left direction in comparison with the conventional microwave oven, whereby the load against the wall surface, on which the apparatus of the present invention is mounted, can be equalized and simultaneously reduced.

Next, the construction for mounting the apparatus of the present invention on a wall surface of a kitchen will be below described with reference to the above described FIGS. 1 to 5, FIG. 6, which is a front view showing a back plate 50 of the body 11, FIG. 7, which is a perspective view showing the back plate 50, FIG. 8, which is a perspective view showing a fixing plate 10, and the like.

Figure 7:
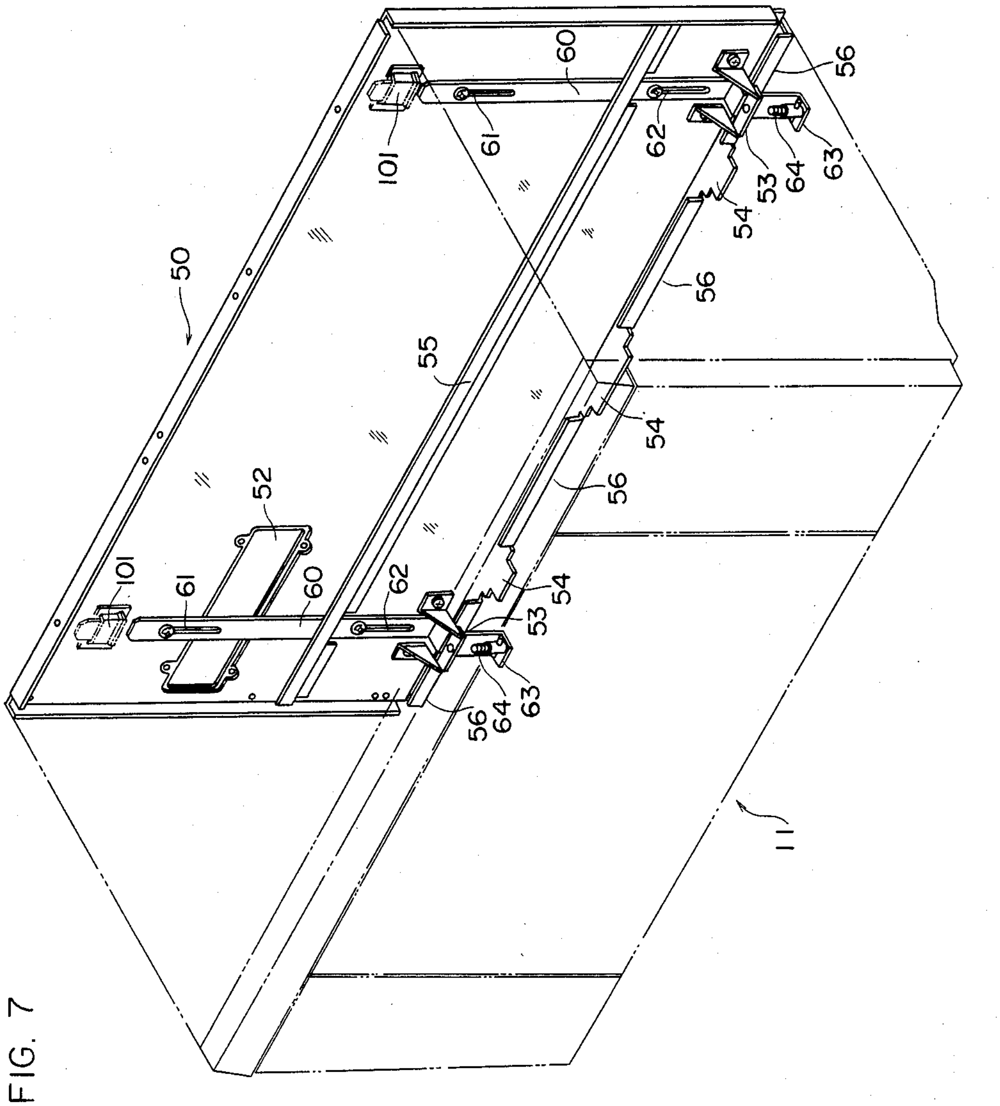
FIG. 7 is a perspective view showing the back plate as shown in FIG. 6.

As shown in FIG. 7, the rear surface of the body 11 is closed with the back plate 50. The back plate 50 is formed in rectangular shape having an external size which is same as or slightly smaller than that of the rear surface of the body 11. The back plate 50 is provided with flanges projecting forwardly on three sides—right side, left side and upper side—excepting the lower side, respectively. Although the back plate 50 is provided with a flange projecting forwardly likewise also on the remaining lower side thereof, four portions of the lower side flange other than three portions—one portion almost halfway between the right end and the left end of the back plate 50 and two portions slightly to the center of both ends thereof—are upwardly bent, whereby forming four ridges 56,56 . . . , which function as engaging members, turning upwardly. At three portions other than the ridges 56, 56 . . . said flanges projecting forwardly from the lower side of the back plate 50 are further projected forwardly from the front side of the ridges 56, 56 . . . to form positioning spacers 54, and 54. Each of the positioning spacers 54, and 54 comprises a base plate 54*b* projecting from the front end of the ridge 56 by a length L and a front plate 54*f* having a width slightly smaller than that of the base plate 54*b* and projecting from the front end of the base plate 54*b* by further a length, as shown in FIGS. 9-A, B and C which are a plan view and side sectional views showing the positioning plate 54, respectively.

On the other hand, the rear end of the hood plate 19 is upwardly bent to form a flange 19*f*, as shown in FIG. 9. The flange 19*f* is provided with a cut-off portion or a slot with the upper surface of the hood plate 19 as the lower side thereof having a width sufficient for introducing the front plate 54*f* of the positioning spacer 54 thereinto at the position opposite to each of the positioning spacer 54 on the base portion thereof.

On account of the above described constructions of the back plate 50 and the hood plate 19, the back plate 50 is fixedly installed in the rear of the body 11 in the following state.

Each of the positioning spacers 54, and 54 formed on the lower side of the back plate 50 is inserted into the lower portion of the rear of the body 11, that is to say, the cut-off portion or slot formed in the rear of the flange 19*f* of the hood plate 19. At this time, the front plate 54*f* of the positioning spacer 54 is inserted into the cut-off portion or slot of the flange 19*f*. However, the base plate 54*b* is not inserted into the cut-off portion or slot but the front edge of the base plate 54*b* is contact with the rear surface of the flange 19*f* to be stopped. In addition, the right side, the left side and the upper side of said back plate 50 is put in an opening in the rear of the body 11 and fastened on the right side plate, the left side plate and the upper plate of the body 11 by means of a screw, respectively.

Accordingly, when the back plate 50 is assembled to the body 11, a gap 54*g* having a width L is formed between the rear end of the hood plate 19 forming the lower surface of the body 11 and each ridge 56 formed on the lower side of the back plate 50.

Figure 6:
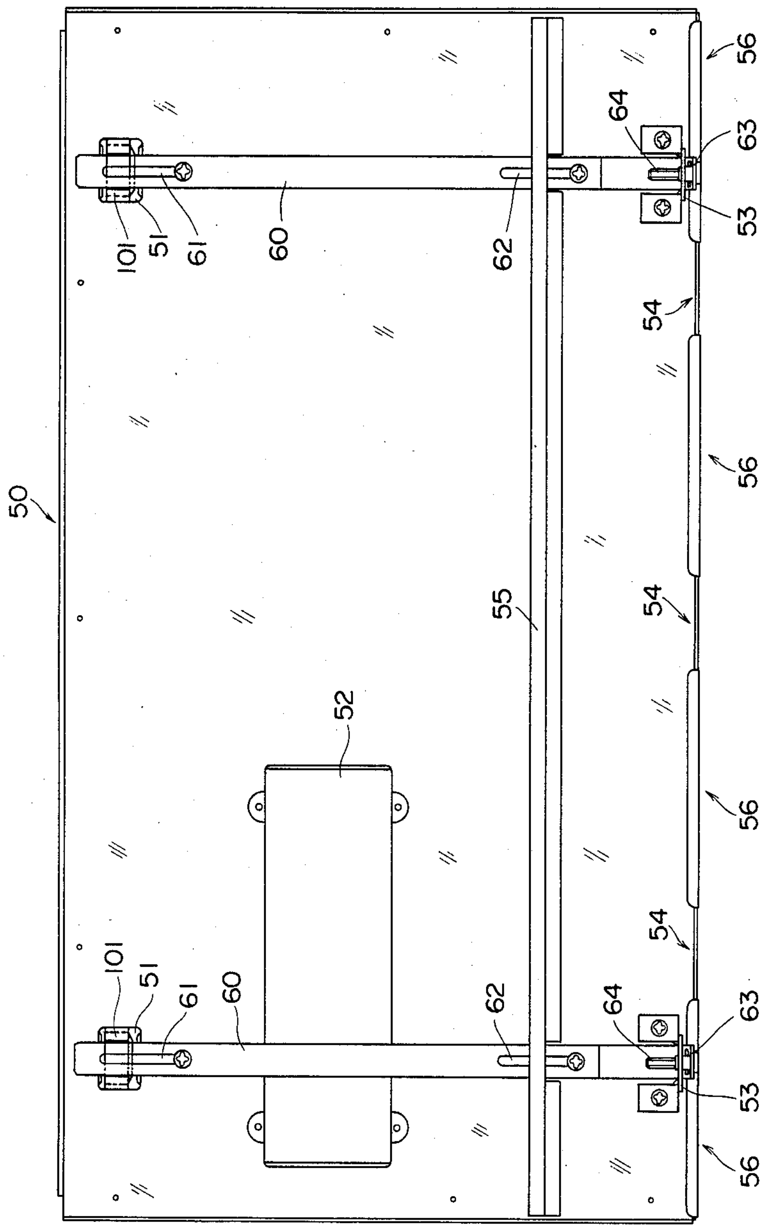
FIG. 6 is a front view showing a back plate closing the rear surface of a wall-mounted type cooking apparatus of the present invention.

A locking bar is provided at the position slightly to the outside of the positioning plate 54 formed on both sides, that is to say, the right side and the left side of the front of the back plate 50. Each of the locking bars 60, 60 is provided with slots 61 and 62 extending up and downwardly at the position to the upper side and the lower side thereof, respectively, so that the locking bars 60, 60 are slidably up- and downwardly mounted on the front of the back plate 50 by means of screws put in the slots 61, 62. FIG. 6 shows the uppermost position where the locking bars 60, 60 can be positioned while FIG. 7 shows the lowermost position where the locking bars 60, 60 can be positioned.

In addition, the back plate 50 is provided with openings 51, 51 at the positions slightly above the positions of the upper ends of the locking bars 60, 60 when they are positioned at the lowermost position thereof. Locking members 101, 101 projectingly mounted on a fixing plate 10, which is described later, are projected through the openings 51, 51 from the rear side of the back plate 50. The openings 51, 51 are provided at the positions so that they can be visually confirmed from the front of the body 11 when the upper grille 12 is removed.

On the other hand, the lower portion of each of the locking bars 60, 60 is first bent forwardly and the front end thereof is further bent downwardly so that each of the locking bars 60, 60 can be prevented from contacting with the portions bent forwardly and upwardly for forming the ridge 56 formed on the lower side of the back plate 50 even when the locking bar 60, 60 are positioned at the lowermost position thereof. The lower end portion of each of the locking bars 60, 60 is bent forwardly again to form a horizontal portion 63. The horizontal lowermost portion 63 of the locking bar 60 is designed to position slightly above the lowermost end of the back plate 50 when the locking bar 60 is positioned at the uppermost position thereof. A stepped screw 64, which is prevented from falling out from horizontal portion 63 by a stopper, is mounted on each horizontal lowermost portion 63 with turning a threaded portion thereof upwardly. In addition, two stoppers 53, 53 provided with a threaded hole, in which the threaded portion of the stepped screw 64 is screwed, are provided at the position to the lower side of the back plate 50. Each stopper 53 is fixedly mounted on the back plate 50 so as to cross the locking bar 60 in the right and left direction. The portion of the stopper 53 opposite to the locking bar 60 is formed in horizontal plate-like shape. In this horizontal plate-like portion a threaded hole, in which the threaded portion of the stepped screw 64 is screwed, is formed. When the threaded portion of the stepped screw 64 is screwed in the threaded hole of the stopper 53 until the root thereof (until the stepped portion), the locking bar 60 is positioned at almost the uppermost position thereof, the horizontal lowermost portion 63 being positioned at the position slightly above the lowermost position of the back plate 50, and the locking bar 60 being slightly immersed in the lower side of the body 11, that is to say, the hood plate 19. In addition, the predetermined portion of the hood plate 19 is cut off not so as to obstruct the up and down movement of the lower portion of the locking bar 60, as shown in FIG. 5.

Furthermore, 52 designates an opening for putting the damper/duct connector 18 therein and 55 designates a z-like shape channel member for dividing a gap, which is formed in the front of the back plate 50 when the back plate 50 is installed on the body 11, into two parts—the upper part and the lower part.

Next, a fixing plate 10 is described below. The fixing plate 10 has such a shape as shown in FIG. 8 and an external size which is same as or slightly smaller than the back plate 50. The right side, left side and uppe side of the fixing plate 10 are forwardly projected similarly to the back plate 50 to be formed in flange-like shape. In addition, the lower side of the fixing plate 10 is first forwardly projected by the size, which is slightly larger than the size of the ridge 56 formed on the lower side of the back plate 50 in the front and rear direction, and then upwardly bent. But, cut-off portions 104, 104 . . . for positioning are formed in the portion corresponding to said positioning spacers 54, 54 and 54 of the back plate 50 in the upwardly bent portion. Accordingly, in the lower side portion of the fixing plate 10 four grooves 106, 106 . . . having an almost U-letter-like section seen from the side are formed at the positions corresponding to each ridge 56 formed on the lower side of the back plate 50. The grooves function as supporting members.

A band-like projecting portion 112 is projected toward the front of the fixing plate 10 from the rear thereof by the distance, which is same as the projecting length of the right, left and upper side flanges, almost all over the width in the right and left direction of the upper side portion of the fixing plate 10. The formation of the band-like projecting portion is carried out by an extrusion molding method. A band-like in the right and left direction locking member 101 provided with openings at the upper and lower portion thereof and further projecting from the band-like projecting portion 112 is formed at the positions corresponding to the openings 51, 51 of the back plate 50 on both side portions of the band-like projecting portion 112. The locking member 101 is shown in every drawing. As shown in FIG. 10, which is a longitudinal sectional view taken at the central part in the right and left direction of the locking member 101, an edge side of the lower opening of the band-like projecting portion of the locking member 101 is cut off so as to be apart from the surface of the band-like projecting portion 112 of the fixing plate 10. Each locking bar 60 is adapted to be put in the opening of the locking member 101 upwardly when the locking member 101 is projected toward the front from the rear of the back plate 50 through the opening 51. In addition, the lower opened portion of the locking member 101, through which the locking bar 60 is inserted, is tapered in the direction of aparting from the surface of the fixing plate 10 (the forward direction) so that each locking bar 60 may be easily, surely and smoothly inserted through the opening of each locking member 101.

Bolt holes 110, 110 . . . and 111, 111 . . . for fixedly mounting the fixing plate 10 on the wall surface and the like of a kitchen are provided at four corners of the fixing plate 10 and almost all over the width in the right and left direction of the lower portion of the band-like projecting portion 112. Although in usual the fixing plate 10 is fixedly mounted on the wall surface by the use of the bolt holes 110, 110 . . . provided at four corners thereof, when the suitable pillar and the like do not exist at the corresponding positions, the bolt holes 111, 111 . . . which are arranged in the right and left direction, may be suitably and selectively used.

Figure 8:
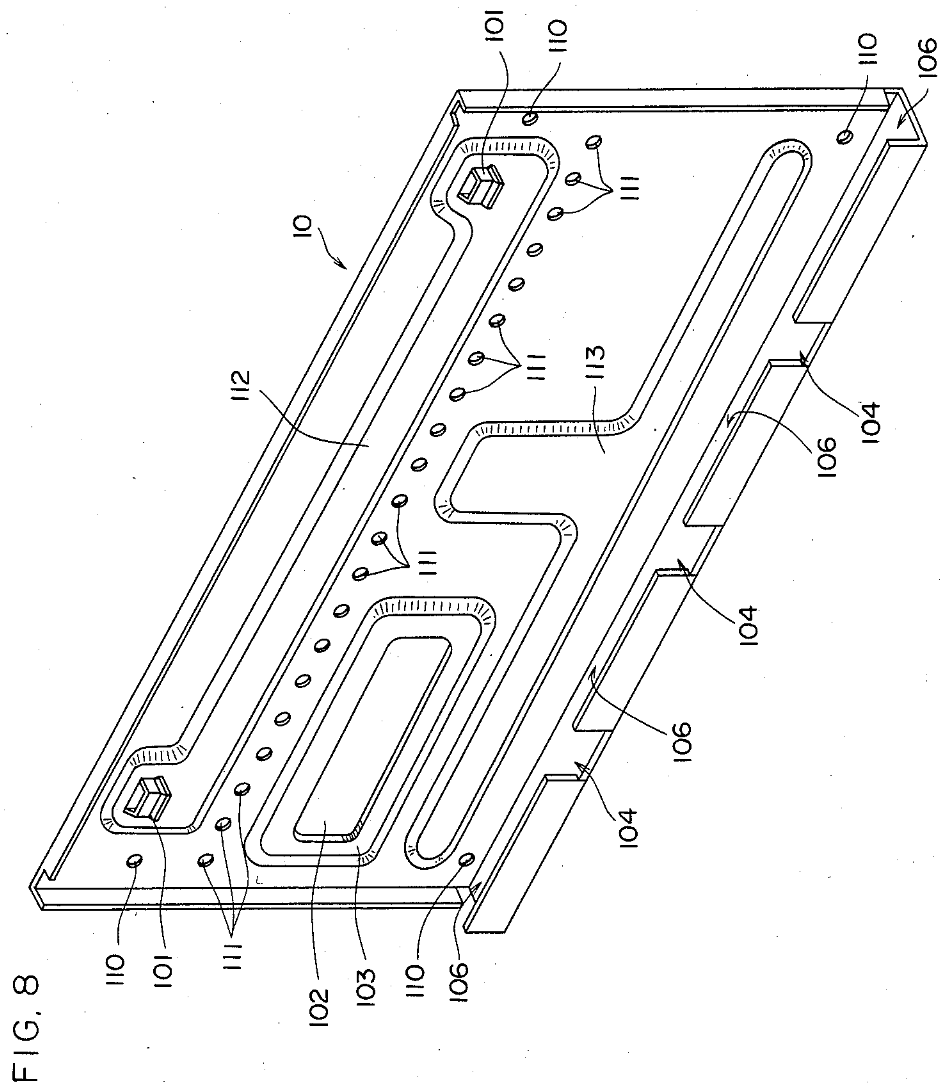
FIG. 8 is a perspective view showing a fixing plate for installing a wall-mounted type cooking apparatus of the present invention on the wall surface, FIGS. 9-A, B and C are a plan view and side sectional views showing the structure of a positioning spacer and the operating state thereof, respectively.

Referring to FIG. 8, 102 designates an opening for the damper/duct connector 18 opened at the position corresponding to the opening 52 of the back plate 50. At the circumference of the opening 102 a projecting portion 103 is formed by the extrusion molding method similarly to the band-like projecting portion 112. Furthermore, a projecting portion 113 is formed in the right side portion of the central portion in the right and left direction and the up and down direction of the lower side portion of the fixing plate 10 by the extrusion molding method to serve as a spacer between the fixing plate 10 and the back plate 50.

The apparatus of the present invention having the above described construction is mounted on the wall surface of a kitchen and the like in the following manner:

At first, the fixing plate 10 is fixedly mounted on the wall surface of the space, in which usually a range hood is installed, over the position of a kitchen where the heating units 3, 3 . . . are installed. At this time, the bolt holes 110, 110 . . . provided at four corners of the fixing plate 10 or the bolt holes 111, 111 . . . linearly arranged are used according to the state of the wall surface of the range hood space.

Then, the body 11 is mounted on the fixing plate 10 fixedly mounted on the wall surface. But the back plate 50 is fixedly mounted on the rear of body 11 when the apparatus of the present invention is manufactured in the factory, so that it is unnecessary for the user to assemble the apparatus. When the back plate 50 was fixedly mounted on the body 11, only each narrow front plate **54*f* of the position spacer 54 formed on the lower side of the back plate 50 is inserted into each cut-off portion or slot of the rear end flange of the hood plate 19 and the front end of each wide plate 54*b* is contact with the rear end of the hood plate 19 to be stopped. Accordingly, as shown in, for example, FIG. 5 characteristically, four gaps 54*g*, 54*g* . . . (divided into four gaps 54*g*, 54*g* . . . by three positioning spacers 54, 54 and 54) having a width equal to a length L in the front and rear direction of the base plate 54*b* of each positioning spacer 54 are formed between the front end of the ridge 56 formed on the lower side of the back plate 50 and the rear end of the hood plate 19 in the rear side portion of the lower surface of the body 11 on which the back plate 50 is fixedly mounted. Each the ridge 56 is formed in the back plate 50 side of the gaps 54*g*, 54*g*** . . . respectively.

Now, a person lifts the body 11, on which the back plate 50 is fixedly mounted, to the height of the fixing plate 10, which is previously fixedly mounted on the wall surface and then puts each ridge 56 formed at the rear end of the lower surface of the back plate 5 in each groove 106 provided at the lower end of the fixing plate 10, as shown in FIG. 11. At this time, when each ridge 56 can not be satisfactorily put in each groove 106, the body 11 is slid right and left against the fixing plate 10. As a result, the base plate **54*b* of each positioning spacer 54 is placed into and engaged with each cut-off portion 104 formed between the front side of each groove 106 of the fixing plate 10 whereby each ridge 56 is put in each groove 106 to be stopped. Then, the person pushes up the front lower portion of the body 11 upwardly to rotate the body 11 with the ridges 56, 56 . . . formed on the lower side of the back plate 50 put in the groove 106, 106 . . . formed in the lower side of the fixing plate 10 as a center, whereby adhering the rear surface of the back plate 50 to the front surface of the projecting portions 112, 113, 103 and the like of the fixing plate 10. The relation among the back plate 50, the fixing plate 10, the positioning spacer 54 and the like under this state is shown in FIGS. 12-A, B and C in the form of plane view and side sectional views. As obvious from FIGS. 12-A, B and C, the positional relation between the back plate 50 (or the body 11) and the fixing plate 10 is determined in the right and left direction by putting the base plates 54*b*, 54*b* . . . of the positioning spacers 54, 54 . . . in the cut-off portions 104, 104 formed on the lower side of the fixing plate 10 and in the up and down direction by putting the ridges 56, 56 . . . formed on the lower side of the back plate 50 in the grooves 106, 106 . . . of the fixing plate 10**.

As described above, when the rear surface of the back plate 50 is adhered to the front surface of the fixing plate 10, the locking member 101, 101 projecting from the front surface of the fixing plate 10 are forwardly projected through the openings 51, 51 formed at the positions to both end portions of the upper side surface of the back plate 50. At this time, the person pushes each locking bar 60 projecting on the lower surface of the body 11 upwardly to insert the front end thereof into the opening of each locking member 101 toward the upper side from the lower side. Then, the stepped screw 64 standing on the horizontal lower end portion 63 of the locking bar 60 is screwed in the threaded hole of the stopper 53 until the stepped portion contacts with the lower surface of the stopper 53. This state is shown in FIG. 4. The weight of the body 11 is supported by engaging the ridges 56, 56 . . . formed on the lower side of the back plate 50 with the grooves 106, 106 formed on the lower side of the fixing plate 10 and inserting and locking the upper portion of the locking bars 60, 60 on the locking member 101, 101. In addition, the locking bars 60, 60 inserted into the locking members 101, 101 can be easily confirmed by eyes from the front of the body 11 by removing the upper grille 12.

The removal of the body 11 mounted on the wall surface is carried out in the following manner:

At first, the stepped screw 64 is loosened. At this time, since the body 11 is mounted on the fixing plate 10 at the upper and lower positions on the rear surface thereof, an angular moment of forwardly and downwardly rotating the body 11 with the rear side of the bottom thereof (the lower side of the back plate 50) as an axis of rotation is added thereto. Accordingly, a considerable load is added to the upper portion inserted into the locking member 101 of the locking bar 60. On this account, it is difficult to say that the locking bar 60 can be smoothly and easily pulled downwardly when the body 11 mounted on the wall surface is removed, whereby requiring a force to some extent. On the contrary, in the apparatus of the present invention, since the stepped screw 64 fixedly mounting the locking bar 60 thereon do not fall from the horizontal lowermost portion 63 of the locking bar 60, as the stepped screw 64 is loosened, the stepped screw 64 is gradually moved downwardly in relation to the stopper 53 (fixedly mounted on the back plate 50) whereby also the locking bar 60 is downwardly moved. At the time when the stepped screw 64 completely comes out of the threaded hole of the stopper 53 also the horizontal lowermost portion 63 of the locking bar 60 is projected from the lower surface of the hood plate 19 by a distance equal to the distance of the downward movement of the stepped screw 64 (at this time, the upper end of the locking bar 60 is held inserted into the locking member 101). Then, if the lower portion of the locking bar 60 projecting from the lower surface of the hood plate 19 is pulled downwardly with lifting the front end portion of the body 11 to support, the insertion of the locking bar 60 into the locking member 101 is released whereby the body 11 can be removed from the mixing plate 10, that is to say, the wall surface.

Figure 13:
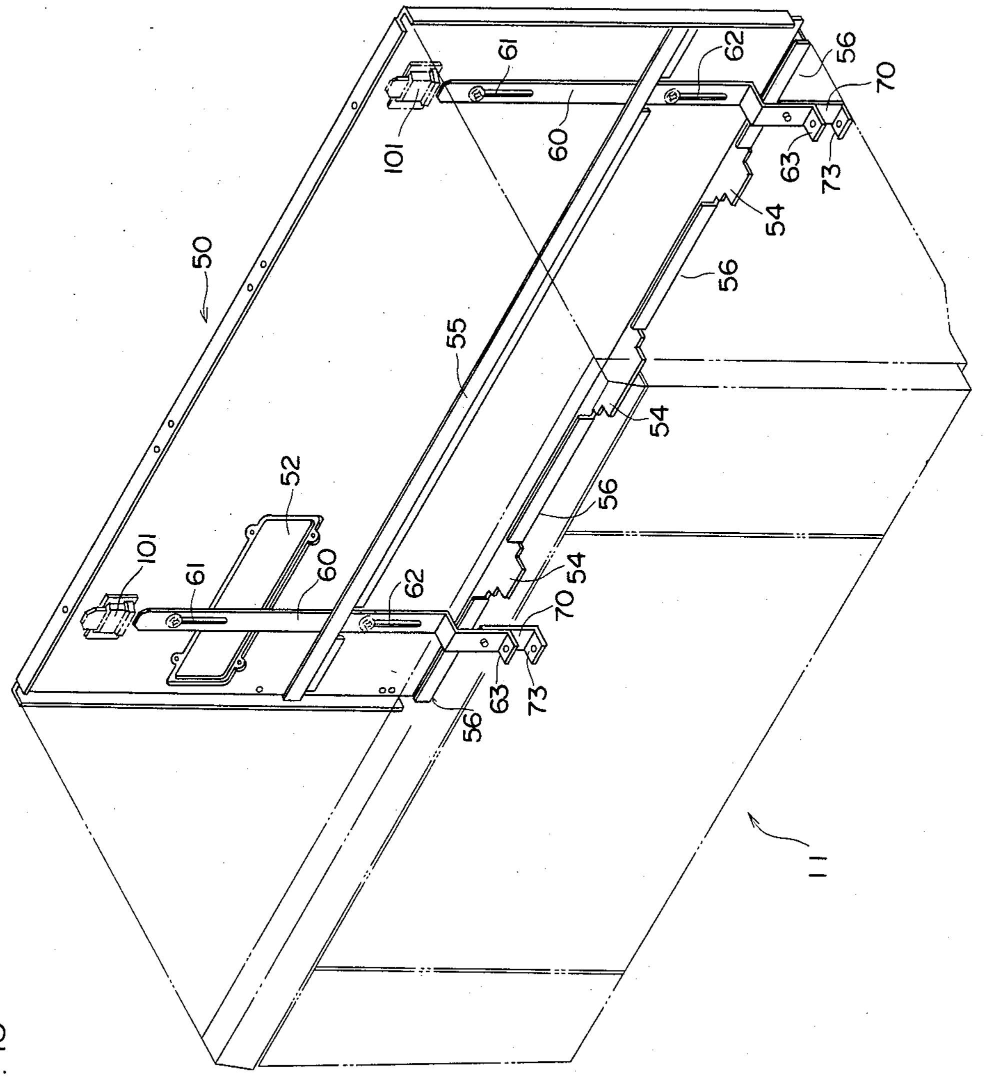
FIG. 13 is a perspective view showing a back plate in the second preferred embodiment of the present invention.
Figure 14:
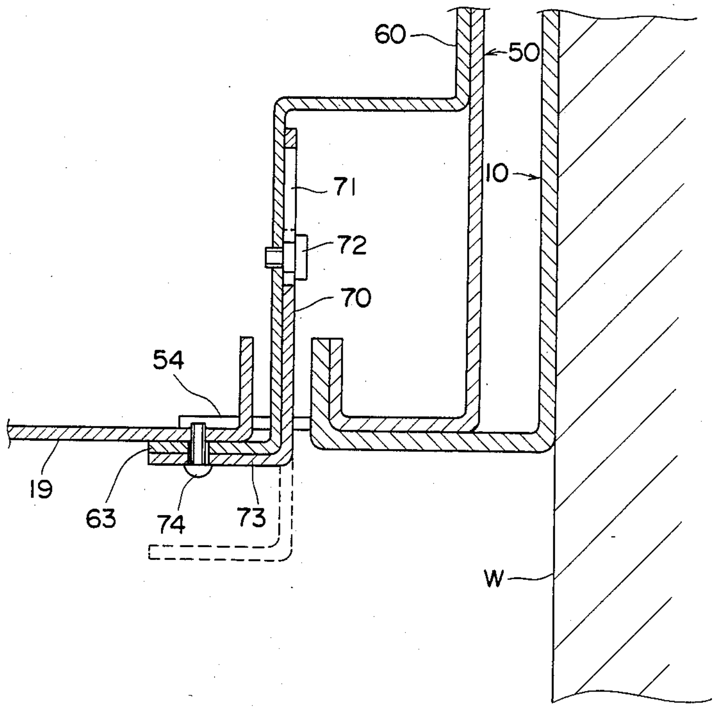
FIG. 14 is a side sectional view showing a locking bar in the second preferred embodiment of the present invention.

FIGS. 13, 14 show the second preferred embodiment of the present invention, in which FIG. 13 is a perspective view showing a back plate 50 and FIG. 14 is a side sectional view showing the fixedly mounted state of a locking bar 60. In this second preferred embodiment, the locking bar 60 is not fixedly mounted on the stopper 53 used in the first preferred embodiment but fastened on the lower surface of the hood plate 19 by means of a screw 74. In order to make the pulling down operation of the locking bar 60 in the removal of the body 11 from the fixing plate 10 easy, the locking bar 60 is provided with an auxiliary bar 70 on the lower portion thereof respectively. Each auxiliary bar 70 is provided on the rear side of the up and down directed portion, which is first forwardly bent at the lower portion thereof and further downwardly bent, of the locking bar 60 by means of a stepped screw 72. Since the stepped screw 72 is inserted into a long slot 71 formed along the up and down direction of the auxiliary bar 70, the auxiliary bar 70 is movable up-and downwardly in relation to the locking bar 60. In addition, the lower portion of the auxiliary bar 70 is forwardly bent to form a horizontal portion 73, whereby the auxiliary bar 70 has a L-letter-like side section as a whole. Furthermore, the horizontal portion 73 of the auxiliary bar 70 is provided with a hole into which a screw 74 is inserted, so that both horizontal portions 73, 73 and horizontal lower end portions 63, 63 may be fixedly mounted on the hood plate 19 by means of said screw 74.

In the second preferred embodiment, the body 11 is fixed on the fixing plate 10 by upwardly moving both locking bars 60, 60 to insert the upmost end of the locking bars 60, 60 into the locking members 101, 101 similarly to the first preferred embodiment. Both the locking bars 60, 60 are further moved upwardly until each horizontal lower end portion 63 of thereof contacts with the lower surface of the hood plate 19. Both the auxiliary bars 70, 70 are upwardly moved and each horizontal portion 73 thereof is fixedly mounted on the lower surface of the hood plate 19 together with each horizontal lower end portion 63 by means of the screw 74.

In order to remove the body 11 from the wall surface, at first the screw 74 is removed. When the screw 74 is removed, the locking bar 60 is fixedly supported between the back plate 50 and locking member 101 due to a forward angular moment of the body 11, as described above, but the auxiliary bar 70 goes down until the upper end of the long slot 71 thereof contacts with stepped screw 72. Accordingly, the locking bar 60 can be allowed to easily go down whereby the body 11 can be removed from the fixing plate 10 by pulling the auxiliary bar 70, which was gone down from the lower surface of the hood plate 19, further downwardly by the person.

In addition, the state of the auxiliary bar 70 being gone down is shown in FIG. 13 and the state of the auxiliary bar 70 fixedly mounted at the upmost position thereof is shown by a solid line while the state of the auxiliary bar 70 gone down is shown by a broken line in FIG. 14.

Figure 15:
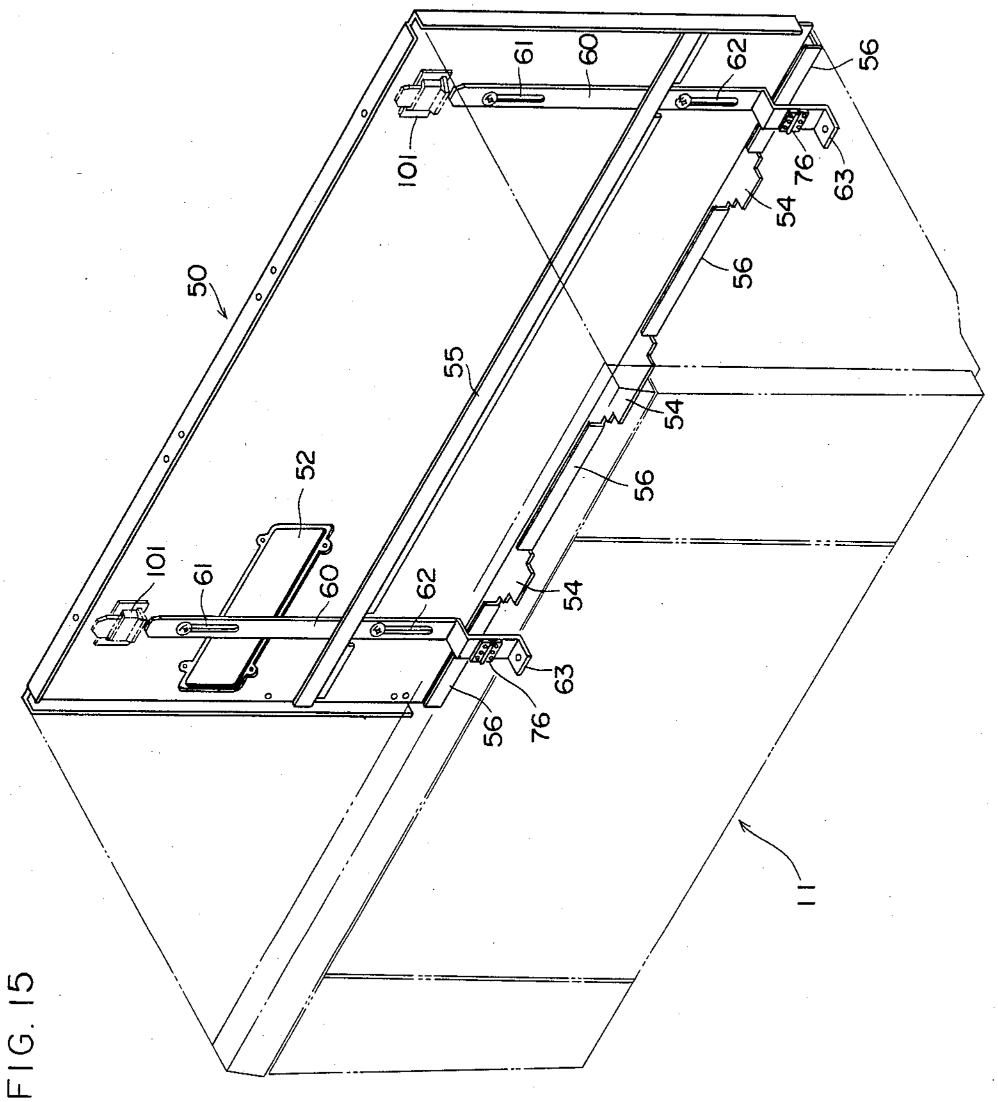
FIG. 15 is a perspective view showing a back plate in the third preferred embodiment of the present invention.
Figure 17:
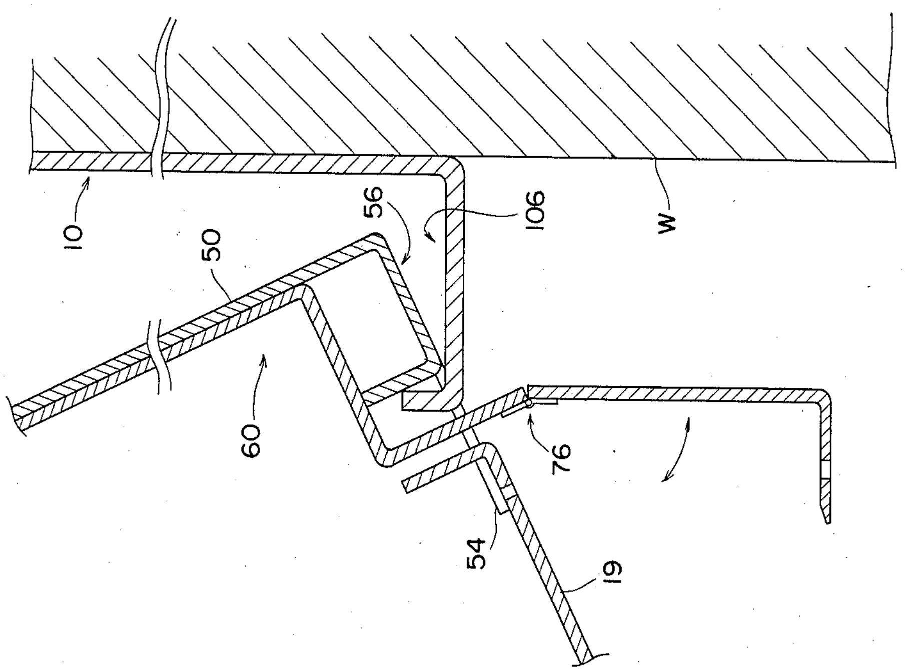
FIG. 17 is a side sectional view showing the state of a locking bar in the third preferred embodiment of the present invention when mounted on the wall surface.
Figure 16:
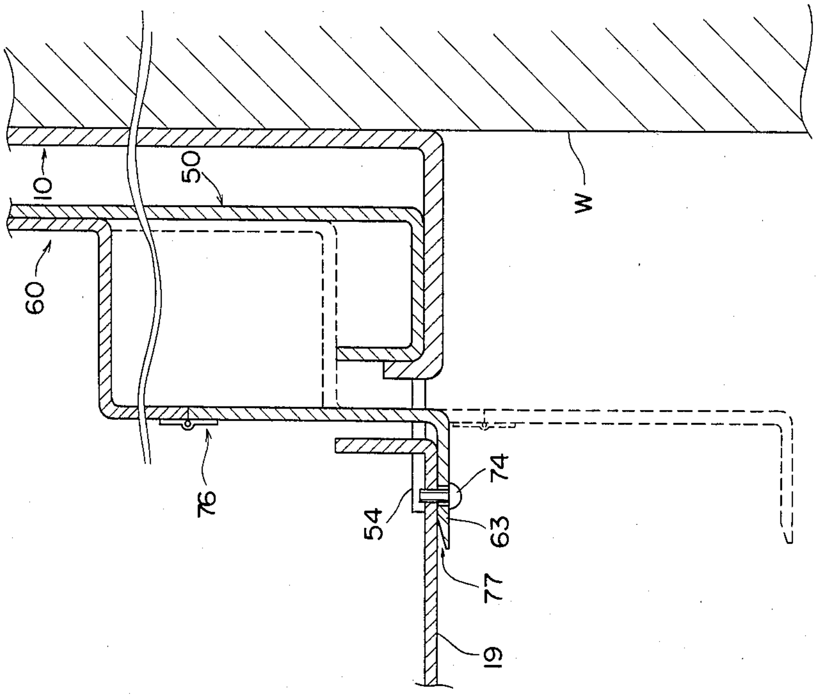
FIG. 16 is a side sectional view showing a locking bar in the third preferred embodiment of the present invention.

FIGS. 15 to 17 show the third preferred embodiment of the present invention, in which FIG. 15 is a perspective view showing the back plate 50, FIG. 16 being a side sectional view showing the fixedly mounted state of the locking bar 60 when the body 11 was mounted on the fixing plate 10, and FIG. 17 being a side sectional view showing the state of the body 11 and the fixing plate 10 when the former is mounted on the latter.

In this preferred embodiment, the portion of the up and down directed portion, which is first forwardly bent and then downwardly extending of the lower portion, of the locking bar 60 is provided with a hinge 76 halfway thereof and the portions below the hinge 76 are forwardly bendable. In addition, the front and upper surface of the horizontal lowermost portion 63 of the locking bar 60 is tapered in the forward direction so as to be increasingly apart from the lower surface of the hood plate 19.

In the apparatus of the present invention, when the body 11 is mounted on the wall surface, at the time when the ridges 56, 56 formed on the lower side of the back plate 50 is put in the grooves 106, 106 . . . formed on the lower side of the fixing plate 10, the back plate 50 and the locking bars 60, 60 are inclined so that the lower side portions thereof may approach to the wall surface W, as shown in FIG. 17. Accordingly, there is the possibility that the lower end portion of the locking bar 60 contacts with the wall surface W whereby the wall surface W is damaged and the locking bars 60, 60 are broken or damaged when the apparatus of the present invention is mounted on the wall surface. However, if the apparatus of the present invention is constructed as shown in this preferred embodiment, since the lower portion of the locking bars 60, 60 are bent in the direction of going away from the wall surface W when the body 11 is mounted on the fixing plate 10, as shown in FIG. 17, there is no possibility above described.

Although the body 11 is fixed on the fixing plate 10 by upwardly moving the locking bars 60, 60 and inserting the upmost end of the locking bars 60, 60 into the locking member 101, 101 similarly to the above described preferred embodiments, in this preferred embodiment, the front side of the horizontal lower end portions 63, 63 of both the locking bars 60, 60 are tapered, so that a wedgeshaped gaps 77, 77 are formed between the lower surface of the hood plate 19 and the upper surfaces of the horizontal lower end portions 63, 63, respectively, as shown in FIG. 16, when the horizontal lower end portions 63, 63 were fixedly mounted on the lower surface of the hood plate 19. Accordingly, in order to remove the body 11 from the fixing plate 10 mounted on the wall surface W, each screw 74 is removed and then an edge of a standard driver, whose edge has minus-letter-like shape, and the like is inserted into and prize open the wedge-shaped gap 77 formed between the lower surface of the hood plate 19 and the upper surface of the horizontal lower end portion 63, whereby capable of pulling down the locking bar 60 to some extent. After this, the locking bar 60 can be easily gone down by the person's fingers whereby the body 11 can be removed from the wall surface W.

Figure 18:
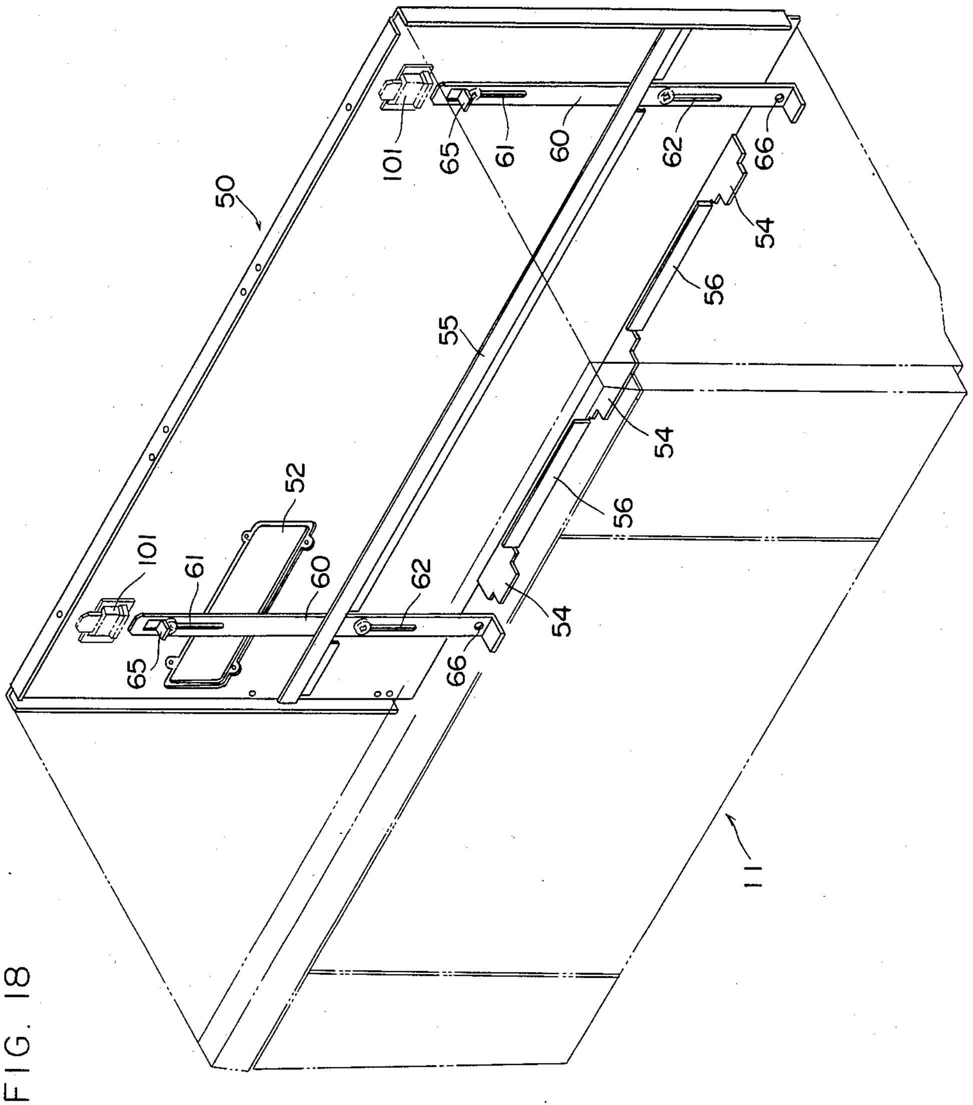
FIG. 18 is a perspective view showing a back plate in the fourth preferred embodiment of the present invention.
Figure 19:
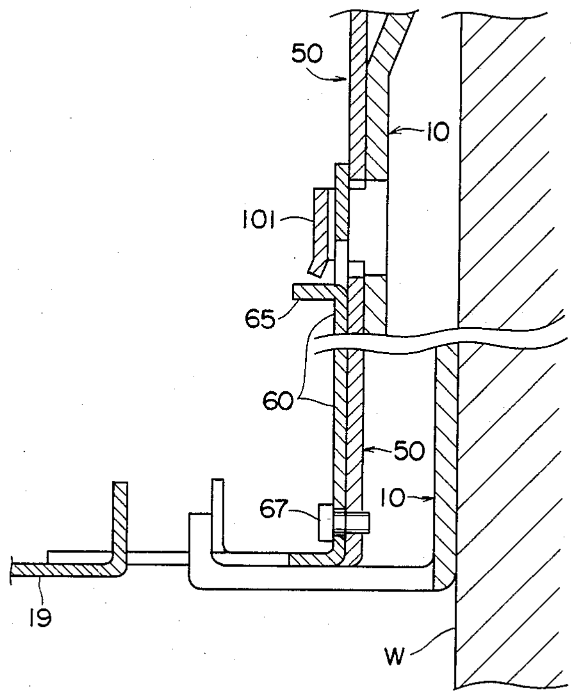
FIG. 19 is a side sectional view showing a locking bar in the fourth preferred embodiment of the present invention.
Figure 20:
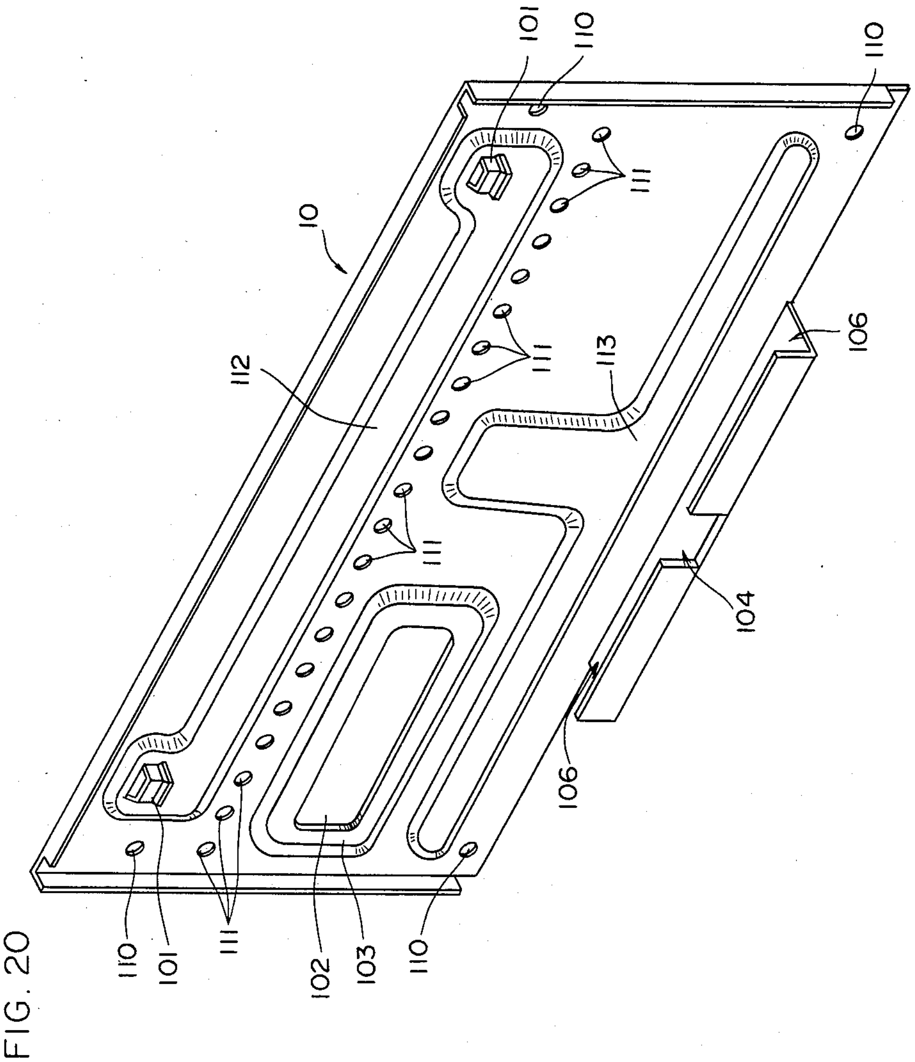
FIG. 20 is a perspective view showing a fixing plate in the fourth preferred embodiment of the present invention.

FIGS. 18 to 20 show the fourth preferred embodiment of the present invention, in which FIG. 18 is a perspective view showing a back plate 50, FIG. 19 being a side sectional view showing a locking bar 60, and FIG. 20 being a perspective view showing a fixing plate 10.

In this fourth preferred embodiment, the locking bars 60, 60 are constructed so as to be fixedly mounted on the back plate 50. That is to say, the lower portion of both locking bars 60, 60 are forwardly bent only at the lowermost portion thereof differently from the above described preferred embodiments. In addition, both the locking bars 60, 60 are provided with a hole respectively for inserting a screw 67 thereinto slightly above the lowermost end thereof. When the locking bar 60 is positioned at the uppermost position thereof, as shown in FIG. 19, the lowermost forwardly bent portion thereof is positioned at a height nearly equal to that of the lower side of the back plate 50. In this preferred embodiment, only two ridges 56, 56 are formed at the places to the center of the lower side of the back plate 50. Also only two grooves 106, 106 are formed at the places to the center of the lower side of the fixing plate 10. These all aim at the avoidance from both the locking bars 60, 60.

On the other hand, in this fourth preferred embodiment, both the locking bars 60, 60 are provided with a projection 65 near the upper end portion of the front thereof respectively. The position of each projection 65 is determined so that the projection 65 may just contact with the lower side of the locking member 101 or may be positioned slightly below the lower side of the locking member 101 when the locking bar 60 was fixedly mounted on the back plate 50 by means of the screw 67 at the uppermost position thereof.

Accordingly, in this preferred embodiment, since the projection 65 contacts with the locking member 101 when the upper end of the locking bar 60 is inserted into the opening of locking member 101 in order to fix the body 11 on the fixing plate 10, the insertion of the locking bar 60 into the locking member 101 can be easily confirmed. Then, the locking bar 60 is very slightly gone down and fixedly mounted on the back plate 50 by means of the screw 67.

In order to remove the apparatus of the present invention from the wall surface, the screw 67 is removed and then a driver and the like is inserted into the upper side of the forwardly bent portion of the lowermost portion of the locking bar 60 and the locking bar 60 is slightly gone down by force. After this, it is necessary only to go down the locking bar 60 by fingers in order to release the insertion of the locking bar 60 into the locking member 101.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A wall-mounted type cooking apparatus having a body fixed on a fixing plate mounted on a wall surface, comprising said fixing plate having at least one locking member projecting from front surface thereof and having a substantially vertically disposed inserting opening, at least one supporting member being positioned below said locking member, and said body having a back plate on the rear thereof, said back plate having at least one opening into which said locking member is inserted from the rear of said back plate to project in the front of said back plate, at least one engaging member being positioned below said opening and engaging with said supporting member, at least one locking bar slidably movable in only a substantially vertical direction and mounted on said back plate for fixing said back plate on said fixing plate by substantially vertically upwardly moving and inserting the uppermost portion thereof into said inserting opening of said locking member projecting through said opening, a gap is formed between the lower end of said back plate and the rear end of a bottom plate of said body when the back plate is attached to that body, said gap is formed by at least one spacer projecting toward the rear end of said bottom plate from the lower end of said back plate and engaging said bottom plate.

2. A wall-mounted type cooking apparatus as set forth in claim 1, wherein said supporting member is formed in a U-like cross section, extending laterally and opened upwardly.

3. A wall-mounted type cooking apparatus as set forth in claim 1, wherein said engaging member is formed in a ridge-like cross section projecting upwardly.

4. A wall-mounted type cooking apparatus as set forth in claim 1, wherein the front edge of said supporting member is cut off at the position corresponding to that of said spacer.

5. A wall-mounted type cooking apparatus as set forth in claim 1, wherein an uppermost portion of said locking bar is provided with a projection for contact with said locking member to limit the upward movement thereof when said uppermost portion is inserted into said locking member.

6. A wall-mounted type cooking apparatus having a body fixed on a fixing plate mounted on a wall surface, comprising said fixing plate having at least one locking member projecting from front surface thereof and having a substantially vertically disposed inserting opening, at least one supporting member being postioned below said locking member, and said body having a back plate on the rear thereof, said back plate having at least one opening into which said locking member is inserted from the rear of said back plate to project in the front of said back plate, at least one engaging member being positioned below said opening and engaging with said supporting member, at least one locking bar slidably movable in only a substantially vertical direction and mounted on said back plate for fixing said back plate on said fixing plate by substantially vertically upwardly moving and inserting the uppermost portion thereof into said inserting opening of said locking member projectig through said opening, a gap is formed between the lower end of said back plate and the rear end of a bottom plate of said body when the back plate is attached to that body, said gap is formed by at least one spacer projecting toward the front of said back plate from the rear end of said back plate and engaging said bottom plate.

7. A wall-mounted type cooking apparatus as set forth in claim 6, wherein the front edge of said supporting member is cut off at the position corresponding to that of said spacer.

8. A wall-mounted type cooking apparatus having a body fixed on a fixing plate mounted on a wall surface, comprising said fixing plate having at least one locking member projecting from front surface thereof and having a substantially vertically disposed inserting opening, at least one supporting member being positioned below said locking member, and said body having a back plate on the rear thereof, said back plate having at least one opening into which said locking member is inserted from the rear of said back plate to project in the front of said back plate, at least one engaging member being positioned below said opening and engaging with said supporting member, at least one locking bar slidably movable in only a substantially vertical direction and mounted on said back plate for fixing said back plate on said fixing plate by substantially vertically upwardly moving and inserting the uppermost portion thereof into said inserting opening of said locking member projecting through said opening, said locking bar is provided with an auxiliary bar slidably movable in a substantially vertical direction in relation thereto in the lower side portion thereof.

9. A wall-mounted type cooking apparatus as set forth in claim 8, wherein said auxiliary bar is fixedly mountable on said locking bar when said locking bar is fixedly inserted into said locking member at the upper portion thereof.

10. A wall-mounted type cooking apparatus having a body fixed on a fixing plate mounted on a wall surface, comprising said fixing plate having at least one locking member projecting from front surface thereof and having a substantially vertically disposed inserting opening, at least one supporting member being positioned below said locking member, and said body having a back plate on the rear thereof, said back plate having at least one opening into which said locking member is inserted from the rear of said back plate to project in the front of said back plate, at least one engaging member being positioned below said opening and engaging with said supporting member, at least one locking bar slidably movable in only a substantially vertical direction and mounted on said back plate for fixing said back plate on said fixing plate by substantially vertically upwardly moving and inserting the uppermost portion thereof into said inserting opening of said locking member projecting through said opening, said locking bar is provided with a hinge on the lower side portion thereof and the portions of said locking bar below said hinge are forwardly bendable.

11. A wall-mounted type cooking apparatus having a body fixed on a fixing plate mounted on a wall surface, comprising said fixing plate having at least one locking member projecting from front surface thereof and having a substantially vertically disposed inserting opening, at least one supporting member being positioned below said locking member, and said body having a back plate on the rear thereof, said back plate having at least one opening into which said locking member is inserted from the rear of said back plate to project in the front of said back plate, at least one engaging member being positioned below said opening and engaging with said supporting member, at least one locking bar slidably movable in only a substantially vertical direction and mounted on said back plate for fixing said back plate on said fixing plate by substantially vertically upwardly moving and inserting the uppermost portion thereof into said inserting opening of said locking member projecting through said opening, the lower end portion of said locking bar is forwardly bent and the upper surface of said bent portion is contacted with said bottom plate of said body to fixedly mount said locking bar.

12. A wall-mounted type cooking apparatus as set forth in claim 11, wherein the upper surface of said bent portion is tapered so as to be increasingly apart from said bottom plate of said body toward the front end thereof.

13. A wall-mounted type cooking apparatus according to claim 1 wherein the body has ventilating means providing a ventilating air near a range, said ventilating means being attached to a fixing plate mounted on a wall surface near the range.

14. A wall-mounted type cooking apparatus according to claim 6 wherein the body has ventilating means providing a ventilating air near a range, said ventilating means being attached to a fixing plate mounted on a wall surface near the range.

15. A wall-mounted type cooking apparatus according to claim 8 wherein the body has ventilating means providing a ventilating air near a range, said ventilating means being attached to a fixing plate mounted on a wall surface near the range.

16. A wall-mounted type cooking apparatus according to claim 10 wherein the body has ventilating means providing a ventilating air near a range, said ventilating means being attached to a fixing plate mounted on a wall suface near the range.

17. A wall-mounted type cooking apparatus according to claim 11 wherein the body has ventilating means providing a ventilating air near a range, said ventilating means being attached to a fixing plate mounted on a wall surface near the range.

18. A wall-mounted type cooking apparatus according to claim 6, wherein said supporting member is formed having a U-like cross section, extended laterally and opened upwardly.

19. A wall-mounted type cooking apparatus according to claim 6, wherein said engaging member is formed in a ridge-like cross section projecting upwardly.

20. A wall-mounted type cooking apparatus according to claim 6, wherein an uppermost portion of said locking bar is provided with a projection for contact with said locking member to limit the upward movement thereof when said uppermost portion is inserted into said locking member.

* * * * *